Figure 1:
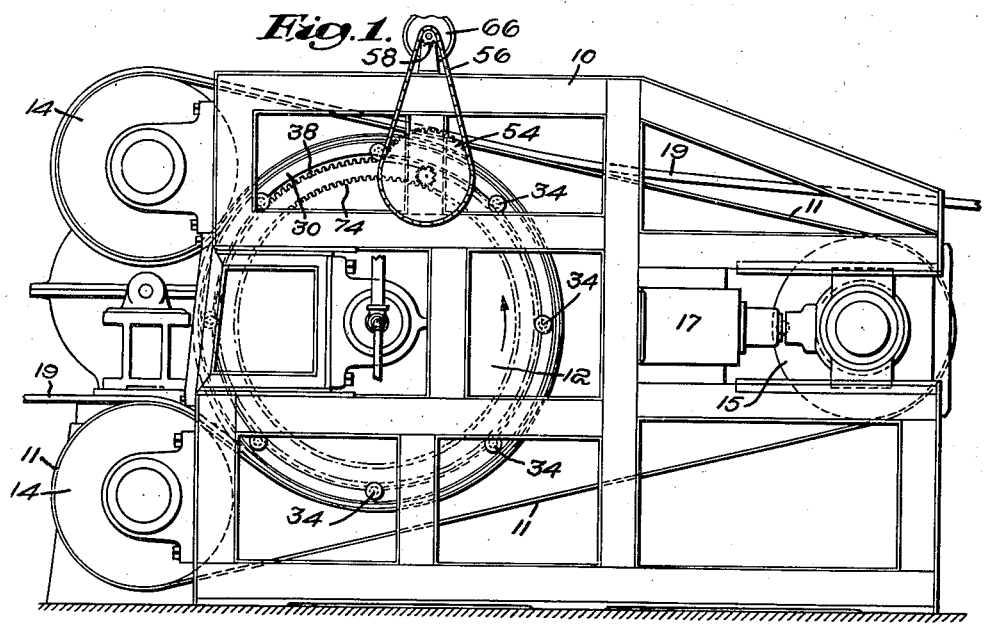

April 29, 1941. W. J. BAKER ET AL 2,240,251
VULCANIZING MACHINE
Filed June 29, 1940 3 Sheets-Sheet 1

Inventors:
Walter J. Baker,
William C. Bleher,
by Kenway & Witter Attorneys

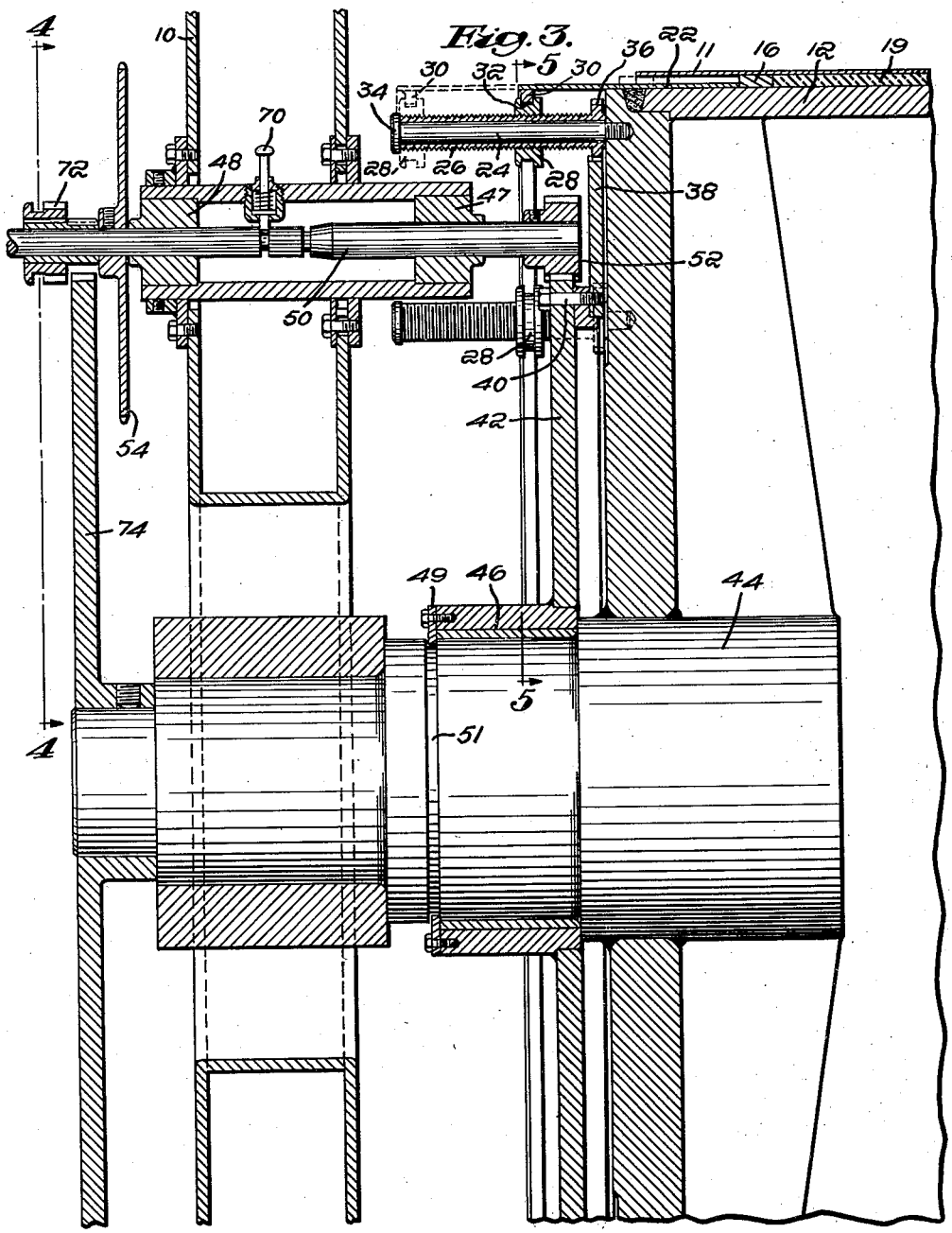

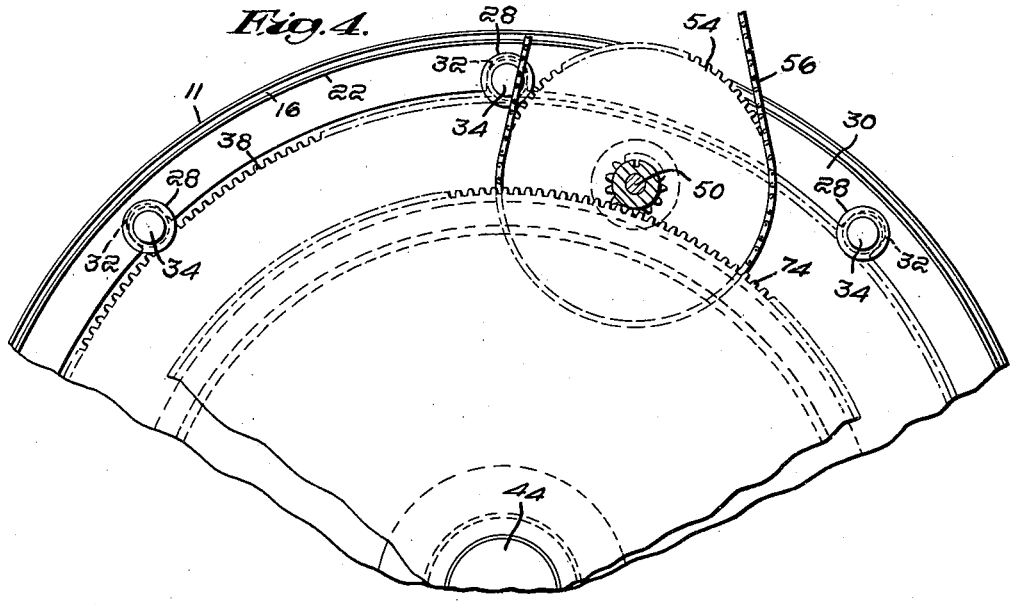
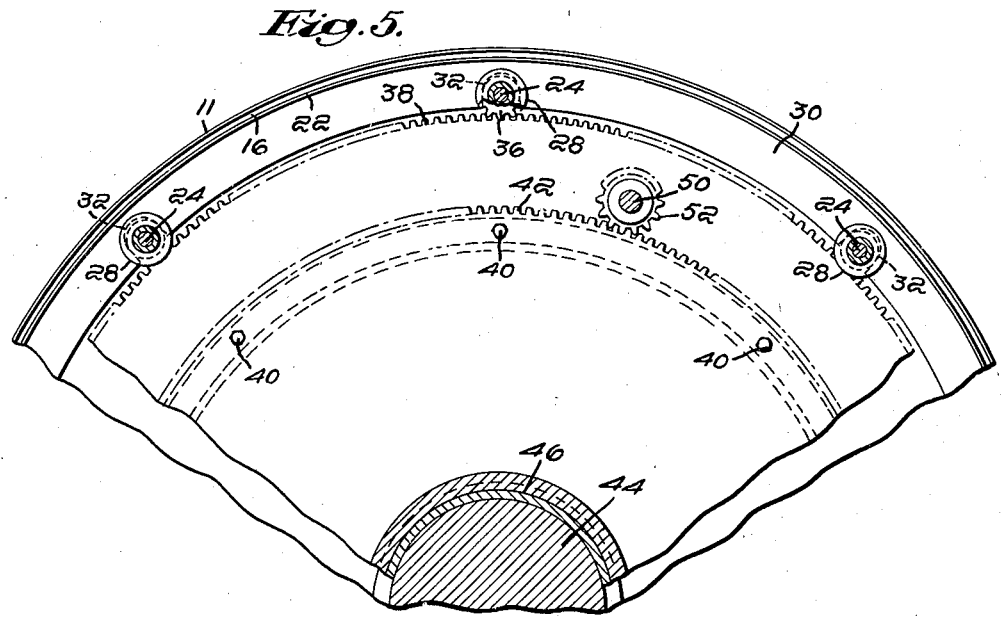

Patented Apr. 29, 1941

2,240,251

UNITED STATES PATENT OFFICE 2,240,251

VULCANIZING MACHINE

Walter J. Baker, West Somerville, and William C. Bleher, West Roxbury, Mass., assignors to Boston Woven Hose & Rubber Company, Cambridge, Mass., a corporation of Massachusetts Application June 29, 1940, Serial No. 343,244

11 Claims. (Cl. 18—6)

This invention relates to apparatus for vulcanizing strip material under pressure and more particularly to the manufacture of conveyor belting. Such belting is relatively thick and is constructed of several plys of fabric covered on both faces and both edges with rubber, the purpose of the cover being to protect the belting against wear and to seal the fabric against the ingress of moisture which would cause rapid deterioration. The invention contemplates apparatus not only for the continuous curing of the belting but furthermore the curing thereof to an absolutely uniform and predetermined width and thickness and the formation of full and completely protected and thoroughly vulcanized edges. Such treatment employs a continuous and trough-like molding channel of predetermined width and depth into which is crowded under pressure uncured belting of a width greater than the width of the cured belting a top wall serving to close the channel and hold the belting under pressure therein during the curing treatment. The molding channel is formed on and around a vulcanizing drum by means of rings on and cooperating with the drum to provide two or more molding channels of the desired width and depth, as disclosed in Baker Patent No. 2,159,543.

The molding pressure exerts a considerable outward thrust on the rings longitudinally of the drum and it has been necessary to use mechanical supports such as disclosed in said patent to prevent outward movement of these rings. Heretofore these supports have been demountable elements embodying end stops and spacers and the necessary requirement to provide for the manufacture of belts of different widths has involved not only a considerable amount of equipment but also the employment of a substantial amount of skilled labor to change the equipment. Such requirements result not only in a large financial investment, most of which is ordinarily idle, but also a cost to the product which is difficult to absorb particularly in the production of relatively short lengths of belting of specified widths.

Our invention herein relates to an improved apparatus of this nature for varying the width of the vulcanizing channel, which apparatus is permanently carried by the vulcanizing machine and is operated by power under the control of the machine attendant, thereby not only eliminating the surplus equipment and skilled labor heretofore required but also making it possible to accept and manufacture relatively smaller orders than would be otherwise practicable. Our improved apparatus provides for quick and relatively small adjustments over the range of widths required and with a dependability and control which renders the machine most efficient and adaptable for the work to be performed. The primary object of the invention resides in the provision of such an improved apparatus for the purpose described.

Figure 2:
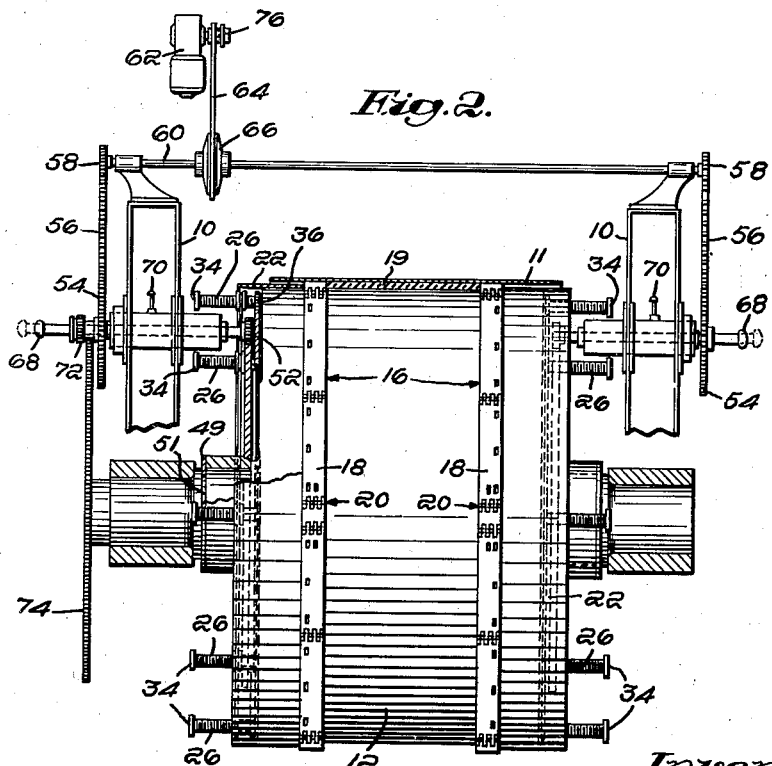

These and other features of the invention will be best understood and appreciated from the following description of a preferred embodiment thereof selected for purposes of illustration and shown in the accompanying drawings in which Fig. 1 is a side elevation of a vulcanizing machine embodying our invention, Fig. 2 is a fragmentary end view thereof, Fig. 3 is a fragmentary vertical section of the vulcanizing drum and parts shown in Figs. 1 and 2, Figs. 4 and 5 are fragmentary views taken on line 4—4 and 5—5 of Fig. 3.

In the drawings, the heavy metal frame of the machine comprises side members 10 of similar shape rigidly connected and supported on a concrete foundation. The frame is designed to support three rolls over which passes a relatively wide steel tension band 11 in a generally triangular path with a re-entrant loop extending about the periphery of a large steam-heated vulcanizing drum or cylinder 12 supported by the frame within the general outline of the path of the band. Two of the band supporting rolls are located adjacent to and forwardly of the vulcanizing drum at 14 and a third roll 15 is located rearwardly of the drum, the tension band being supported on these rolls and having an inwardly extending loop portion engaging the drum. The band is brought to and held under the desired tension by hydraulic pressure means 17 operative to force the roll 15 rearwardly. The drum is rotated slowly in the direction indicated by the arrow and the strip 19 to be vulcanized is fed into the bite formed between the band and the drum as the band leaves the lower roll 14.

The vulcanizing drum is provided with one or more open channels extending continuously therearound and each is bounded on three sides by a bottom wall and two side walls. In accordance with our invention, as illustrated, we form these channels by the application of rings to the cylindrical vulcanizing surface of the drum. In Fig. 2 we have illustrated two such rings 16 applied to the drum in relatively spaced relation whereby forming a channel therebetween, the rings forming the side walls of the channel and the cylindrical surface therebetween forming the bottom wall. The use of such rings provides for a variation in the width as well as the depth of the channel. Furthermore, for open side presses the rings may be of one piece construction, but otherwise they will preferably be formed in sections which may be placed on and removed from the drum which is supported at both ends in the press.

The rings 16 illustrated in the drawings are constructed in segments 18, the segments being curved to fit the drum and having interlocking fingers at their ends joined together by pintles 20. The rings may be drawn into tight engagement with and secured to the drum as by the means disclosed in said Patent No. 2,159,543. The thickness of the rings determines the depth of the channel and corresponds to the thickness of the product to be produced, and this dimension can be changed merely by changing the rings. The rings are supported against outward movement along the drum by abutment means herein illustrated as large annular sleeves 22 telescoped over the ends of the drum and in end engagement with the rings, the primary object of the invention being to provide new and improved means for conveniently and economically varying the width of the ring spacing and of the abutment members 22 cooperating with the rings. This means for adjusting the abutment members is preferably power operated and the mechanism herein illustrated for this purpose will now be described.

Threaded into each end of the drum 12 in relatively spaced relation thereabout and adjacent to its periphery is a circular series of screw studs 24 having heads 34. These studs project outwardly from the ends of the drum and each carries rotatable thereon a sleeve 26 threaded to receive a nut 28 which is recessed at 32 to receive an inwardly extending flange 30 on the outer end of each abutment and held thereby against rotation. The heads 34 of the studs prevent endwise movement of the threaded sleeves and the arrangement is such that rotation of these sleeves moves the nuts and abutments longitudinally of the drum.

Each sleeve 26 has a pinion 36 fixed to its inner end and a large ring gear 38 at each end of the drum is in mesh with all the pinions at its end of the drum. The ring gear is attached by bolts 40 to a smaller gear 42 freely rotatable on the drum axle 44 at 46, the gear 42 being held against movement along the axle 44 by the engagement of a ring 49 within an annular groove 51 in the axle. Mounted in fixed bearings 47 and 48 in each side frame of the machine is a shaft 50 having a pinion 52 on its inner end in mesh with the gear 42. A sprocket wheel 54 on the outer end of each shaft 50 is connected by a chain 56 to a sprocket 58 on a shaft 60 mounted above the machine frame. The shaft 60 is adapted to be driven from an auxiliary source of power, such as a motor 62 through a belt 64, a safety friction clutch being provided at 66 on the shaft 60. It will be apparent that all pinions 36 are driven simultaneously from the motor 62 through the above described connections. This drive can be disconnected by pulling the shafts 50 outwardly to a position disengaging the pinions 52 from the gears 42, shifting knobs 68 being provided at the ends of the shafts and a detent 70 serving to hold each shaft in either of its two positions.

The above described mechanism serves to adjust the abutments members 22 longitudinally or axially of the drum from the auxiliary motor 62. In the normal operation of the vulcanizing machine the drum 12 is rotated slowly from a main source of power (not shown), and the tension band 11 is carried with it in its rotary movement.

A pinion 72 is carried on the outer end of one shaft 50 and is splined thereto for engagement with or disengagement from a gear 74 fixed to the drum axle 44. When once the mechanism has been adjusted to yield the desired ring spacing, it may, if desired, be held or locked in position by sliding pinion 72 into mesh with the gear 74, at the same time disengaging the motor drive clutch 76. Under these conditions the entire drive mechanism comprising gears 42 and 74 will revolve without altering the spaced belting during rotation of the vulcanizing drum.

It is believed that the operation of the machine will be apparent without further description. The adjusting mechanism, serves simultaneously to adjust the two abutment sleeves 22 in opposite directions and in equal degree along the surface of the drum, thus maintaining the molding channel therebetween always central and in alignment with the belt or work handling mechanism, more particularly illustrated in Patent No. 2,179,443.

The rings being of a known width, it is a simple matter to adjust the abutment sleeves 22 to a spacing providing the desired width of molding channel between the rings. It will, therefore, be apparent that variation of this channel to produce belting of different widths is a relatively simple matter. Furthermore, the same rings serve for handling belts of all variations in width and a substitution of rings is required only when a belt of a different thickness is to be produced. Such additional rings as are required to serve this purpose represent the only portion of the apparatus which is non-productive while the machine is in operation, and the expense for such additional ring is minor as contrasted to the expense of additional equipment and the cost of changing the same in such machines as have been known and in use heretofore. It may also be pointed out that the adjusting mechanism will preferably be operated by the auxiliary power and that this power will be under "push buttom" or like relatively simple and convenient control whereby small increments of adjustment between maximum and minimum limits can readily be made.

Having thus described our invention what we claim as new and desire to secure by Letters Patent of the United States is—

1. In a vulcanizing machine, a rotary vulcanizing drum having a cylindrical vulcanizing surface, two relatively spaced rings extending about said surface and providing channel side walls cooperating with a bottom wall formed by said drum surface therebetween, the rings being adjustable longitudinally of the drum to vary the width of the channel, abutment means disposed at the two ends of the drum respectively and cooperating with the rings to support them against outward movement along the drum, and mechanically operated means for simultaneously adjusting the two abutment means at the ends of the drum in opposite directions and in equal degree along the drum.

2. In a vulcanizing machine, the combination defined in claim 1 in which the mechanically operated by power means is operated from an auxiliary source of power and independently of drum rotation.

3. In a vulcanizing machine, the combination defined in claim 1 plus means for locking the abutment means in any selected positions of adjustment upon the surface of the drum.

4. In a vulcanizing machine, a rotary vulcanizing drum having a cylindrical vulcanizing surface, spaced rings extending about said surface and providing channel side walls cooperating with a bottom wall formed by said drum surface therebetween, the rings being adjustable longitudinally of the drum to vary the width of the channel, two annular abutments coaxial of and located at the opposite ends of the drum and cooperating with the rings to support them against outward movement along the drum, the rings being removable from and replaceable on the drum independently of the abutments, and mechanically operated means for simultaneously adjusting the two abutments in opposite directions and in equal degree along the drum.

5. In a vulcanizing machine, a rotary vulcanizing drum having a cylindrical vulcanizing surface, two relatively spaced rings extending about said surface and providing channel side walls cooperating with a bottom wall formed by said surface therebetween, the rings being adjustable longitudinally of the drum to vary the width of the channel, abutment means at the two ends of and disposed about the drum respectively cooperating with the rings to support them against outward movement along the drum, two relatively spaced shafts supported for rotation in bearings fixed relative to drum rotation and with their rotary axes out of alignment with the rotary axis of the drum, a source of power, and driving connections from the source of power to the shafts and from the shafts to the abutment means for simultaneously adjusting the two abutment means at the ends of the drum in opposite directions and in equal degree along the drum.

6. In a vulcanizing machine, a rotary vulcanizing drum having a cylindrical vulcanizing surface, annular means including a sectional ring adapted to be drawn into tight contact with said surface, said means providing an annular channel the bottom wall of which is said surface and the side walls of which are formed by said means, the ring being adjustable longitudinally of the drum to vary the width of the channel, abutment means disposed about the drum and cooperating with the ring to support it against movement along the drum in a direction away from the channel, the ring being removable from and replaceable on the drum independently of the abutment means, and mechanically operated means for adjusting the abutment means longitudinally of the drum.

7. In a vulcanizing machine, a rotary vulcanizing drum having a cylindrical vulcanizing surface, annular members including a ring in contact with said surface providing an annular channel, the ring being adjustable longitudinally of the drum to vary the width of the channel, abutment means disposed about the drum and cooperating with the ring to support it against outward movement along the drum, the ring being removable from and replaceable on the drum independently of the abutment means, a shaft mounted in fixed bearings remote from the rotary axis of the drum, mechanically operated means for driving the shaft, and means including driving connections from the shaft for adjusting the abutment means longitudinally of the drum.

8. In a vulcanizing machine, a rotary vulcanizing drum having a cylindrical vulcanizing surface, annular members including a ring in contact with said surface providing an annular channel, the ring being adjustable longitudinally of the drum to vary the width of the channel, abutment means disposed about the drum and cooperating with the ring to support it against movement along the drum in a direction away from the channel, the ring being removable from and replaceable on the drum independently of the abutment means, a gear fixed to the drum, and means including connections from the gear for maintaining a fixed adjustment of the abutment means during rotation of the drum.

9. In a vulcanizing machine, a rotary vulcanizing drum having a cylindrical vulcanizing surface, annular means including a ring in contact with said surface providing an annular channel the bottom wall of which is said surface and the side walls of which are formed by said means, the ring being adjustable longitudinally of the drum to vary the width of the channel, abutment means disposed about the drum and cooperating with the ring to support it against movement along the drum in a direction away from the channel, a plurality of studs in relatively spaced relation about and projecting outwardly from one end of the drum adjacent to its periphery, a rotary screw threaded sleeve on each stud, a plurality of nuts respectively threaded to the sleeves and cooperating with the abutment means, and means including pinions fixed to the sleeves and a gear coaxial of the drum and in mesh with the pinions for adjusting the abutment means along the drum upon rotation of the gear.

10. In a vulcanizing machine, a rotary vulcanizing drum, a tension band cooperating therewith, circumferential rings adjustable on the drum surface to provide a channel of variable width under the tension band, a circular abutment located axially outside each ring, a series of adjusting devices for the abutments relatively spaced about the drum, and means for simultaneously operating all of said adjusting devices.

11. In a vulcanizing machine, a rotary vulcanizing drum, a tension band cooperating therewith, circumferential rings adjustable on the drum surface to provide a channel of selected width under the tension band, a series of stops spaced about the drum, and means for simultaneously moving all of said stops axially of the drum to support the rings in different positions of adjustment on the drum.

WALTER J. BAKER.
WILLIAM C. BLEHER.